United States Patent [19]

Gold

[11] Patent Number: 4,906,082

[45] Date of Patent: Mar. 6, 1990

[54] LENS APPARATUS FOR A VEHICLE

[76] Inventor: Meyer Gold, 53950 Baywood Shores Dr., Mound, Minn. 55364

[21] Appl. No.: 247,369

[22] Filed: Sep. 21, 1988

Related U.S. Application Data

[63] Continuation-in-part of Ser. No. 132,158, Dec. 14, 1987, abandoned, which is a continuation-in-part of Ser. No. 103,438, Sep. 30, 1987, abandoned.

[51] Int. Cl.⁴ .......................... G02B 3/08; G02B 7/02
[52] U.S. Cl. ..................................... 350/452; 350/247
[58] Field of Search ............... 350/452, 243, 247, 604, 350/605, 606, 318, 639; 248/277; 74/521

[56] References Cited

U.S. PATENT DOCUMENTS

| | | |
|---|---|---|
| 1,622,933 | 3/1927 | Webber . |
| 2,953,961 | 9/1960 | Court ................................. 350/452 |
| 3,159,439 | 12/1964 | Miller . |
| 3,809,462 | 5/1974 | Baumgardner et al. ............ 350/452 |
| 3,826,562 | 7/1974 | Baumgardner et al. ............ 350/452 |
| 3,842,729 | 10/1974 | Mandrup . |
| 3,947,095 | 3/1976 | Moultrie ............................. 350/452 |
| 4,274,714 | 6/1981 | Okamura ............................ 350/452 |
| 4,711,527 | 12/1987 | Rimmell et al. .................... 350/452 |

FOREIGN PATENT DOCUMENTS

| | | |
|---|---|---|
| 252073 | 11/1962 | Austria . |
| 2826938 | 1/1980 | Fed. Rep. of Germany . |
| 55-39845 | 3/1980 | Japan . |
| 57-4440 | 1/1982 | Japan . |
| 60-219140 | 11/1985 | Japan . |

*Primary Examiner*—Bruce Y. Arnold
*Assistant Examiner*—Martin Lerner
*Attorney, Agent, or Firm*—Merchant, Gould, Smith, Edell, Welter & Schmidt

[57] ABSTRACT

The lens apparatus includes a Fresnel lens which can be placed in a fixed and permanent position, e.g., in a fixed frame on the trunk of an automobile, or moved to be within sight of the operator of a vehicle so that when the operator is backing the vehicle so that the lens is approximately perpendicular to the line of sight of the operator in order to expand his/her the field of view. In the latter case, the moving mechanism moves the lens between a stowed position in a housing and an operational position. In another embodiment, the Fresnel lens may be placed between two transparent portions of a bracket which is adapted to be mounted to the trunk of a vehicle.

9 Claims, 6 Drawing Sheets

LENS APPARATUS FOR A VEHICLE

This application is a continuation-in-part of Serial No. 132,158, filed Dec. 14, 1987, now abandoned which, in turn, is a continuation-in-part of Serial No. 103,438, filed Sept. 30, 1987, now abandoned upon which applications priority is claimed under the provisions of 35 U.S.C. Section 120.

BACKGROUND OF THE INVENTION

1. Field of the Invention

The present invention is directed to a Fresnel lens device, particularly for use on a vehicle to increase the field of view so as to see closely behind the vehicle when backing.

2. Description of the Prior Art

Most automobiles are equipped with a rear view mirror and one or two side mirrors. Yet, often this is not enough. There is still a sizeable blind spot directly behind the car. Many of the newer passenger cars are designed with the front of the car (the engine hood) slanting downward, thus giving the driver a clearer view of the road immediately ahead. At the same time designers of most of the new cars have made the rear trunk higher and some tend to sweep upward which further increases the said blind spot.

The National Safety Council's 1987 edition of "Accident Facts" reports 47,900 Motor Vehicle Deaths for 1986 of which 0.3% were caused while backing up. For example, when backing out of a garage it is common to get into the car and look into the rear view mirror or turn around and look directly out the rear window and hope there is nothing directly behind the vehicle. Too often there are obstacles; even children. The problem is not new.

The problem, however, has been recognized. The Fresnel lens is known and has been used to address the indicated problem in some circumstances. A Fresnel lens is a series of concentric lenses which when viewed along a line of sight approximately perpendicular with the lens demagnifies, but expands the field of view. A Fresnel lens has been used, for example, on the side window of a truck so that the truck driver can see down along the side of the truck to determine if there is a car. Also, a similar lens has been attached to the back window of a van of a type which has a substantially vertical back and a substantially vertical back window. In that case, the operator again gets an expanded field of view and can see quite close to the back of the vehicle. The problem, however, is that most vehicles have a back window which is spaced forwardly from the rear of the vehicle. A lens, if attached to such back window, would only show the trunk and not space directly behind the vehicle. In addition, the back window is often inclined or curved. Both characteristics cause distortion in a Fresnel lens and may even cause it to look opaque. Thus, the problem of seeing close to the back of a vehicle while driving in reverse is generally unsolved for most vehicles.

SUMMARY OF THE INVENTION

The present invention is directed to a vehicle which includes an automobile with a rear window and a trunk where the trunk has first and second walls and a conforming region between the first and second walls and such that the first wall is more horizontal then the second wall. The vehicle also includes a Fresnel lens, a mechanism for holding the lens, and a mechanism for attaching the holding mechanism to the first wall so that it is substantially nearer to the conforming region than it is to the rear window. In this way, the operator of the vehicle can look through the Fresnel lens approximately perpendicularly and view ground nearer the automobile than when the operator does not look through the lens. Furthermore, the first wall of the trunk does not block the view.

The present invention, in another sense, is directed to lens apparatus for a vehicle which includes a lens, mechanism for cantilevering the lens from a surface of a wall at the back of the vehicle so that the field of view shows space near the vehicle without showing an excessive part of the wall and so that the lens is approximately perpendicular with respect to a line of sight of an operator of the vehicle, and mechanism for attaching the cantilevering mechanism to the vehicle.

In one embodiment, the cantilevering mechanism is formed as a housing which includes a liner and a side wall unit. Both have flanges between which the wall of the vehicle is received. The liner includes a pair of facing grooves. The lens is held by a holder which slides within the facing grooves. The cantilevering mechanism also includes a mechanism for extending the lens holder with respect to the rest of the housing and, in particular, with respect to the liner. More particularly, a pair of rigid members are connected together in a scissor-like assembly with one end slidably connected to the bottom of the lens holder and the other end slidably connected to the liner. An electrical actuator, such as a linear solenoid, moves one end of the scissor-like assembly together thereby extending the other end and sliding the lens and lens holder upwardly with respect to the housing liner. Likewise, when the actuator is reversed, the ends of the rigid members are separated and the lens and the lens holder are moved downwardly with respect to the liner.

The indicated embodiment is particularly advantageous in that the lens is stowed in a housing preferably entirely or almost entirely beneath the outer surface of a wall, such as the top wall of the trunk of the vehicle. When the electrical actuator is operated, the lens and lens holder extend upwardly to a position wherein the lens is approximately perpendicular to the line of sight of the operator of the vehicle. Thus, the lens is stowed or hidden during periods when it is not needed and it is movable into an operational position at a time when it is desired to be used.

In another embodiment, the housing is rotatably connected with a bracket which is attached to a surface, preferably at the back of the vehicle. This embodiment is particularly advantageous in that it can be readily used on already manufactured automobiles and other vehicles. Again, the actuator may be operated when it is desired to use the lens so that it is at that time moved into the proper position. At other times, it is stowed in the containing housing just rearwardly of but in rather close proximity to, the rear end of the vehicle.

A further advantage of the present apparatus is that the electrical actuator is easily wired in series with the backup lights of the vehicle so that whenever the vehicle is shifted into reverse so that the backup lights go on, the electrical actuator of the lens apparatus operates to extend the lens and lens holder upwardly to an operational position. Similarly, when the vehicle is shifted out of reverse, the actuator functions to retract the lens and lens holder into the housing container.

Thus, the present lens apparatus does not depend on the configuration of a window or a wall, but can be built into a vehicle to move between stowage and operational positions or can be retrofitted to existing vehicles, again in a fashion wherein it is movable between stowage and operational positions.

In a further embodiment, the instant invention includes a lens member for expanding an image in at least one principal direction, and an L-shaped bracket for holding the lens in a vertical position relative to a rear horizontal surface of the vehicle to which it is to be mounted. The bracket may be attached to the rear surface of the vehicle by an adhesive strip which is provided at a lower surface thereof.

The invention, as summarized, and the described advantages can be better understood, however, by reference to the drawings briefly described hereinafter and to the detailed description of preferred embodiment following thereafter.

DETAILED DESCRIPTION OF THE PREFERRED EMBODIMENT

Figure 1:
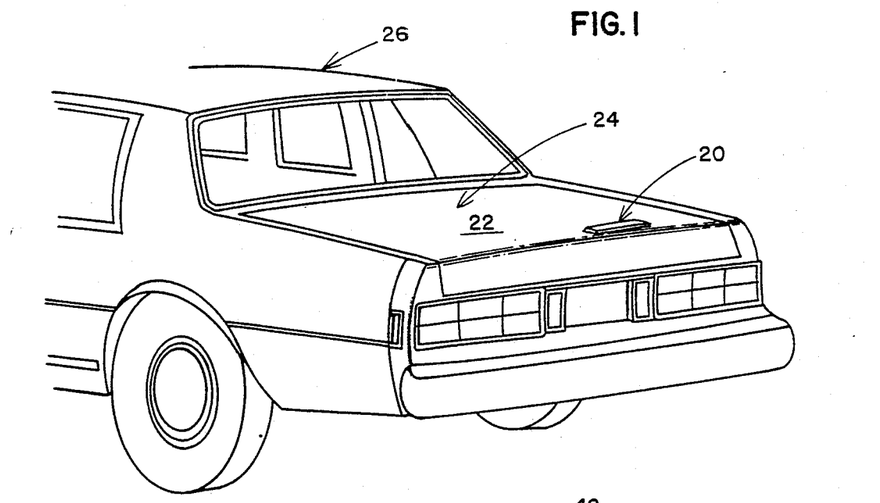
FIG. 1 shows a perspective view of the rear end of a typical automobile wherein apparatus of the present invention is installed beneath the cover appearing on the trunk.

Referring now to the drawings wherein like elements are designated by like reference numerals, and more particularly with reference to FIGS. 1–5, lens apparatus in accordance with the present invention is designated generally by the numeral 20. Apparatus 20 is shown in FIG. 1 mounted in the top wall 22 of trunk 24 of vehicle 26 spaced rearwardly from the back window of the vehicle nearer the rear end of the trunk so that the field of view when looking through the lens shows space directly behind the vehicle and not just the trunk surface.

Figure 3:
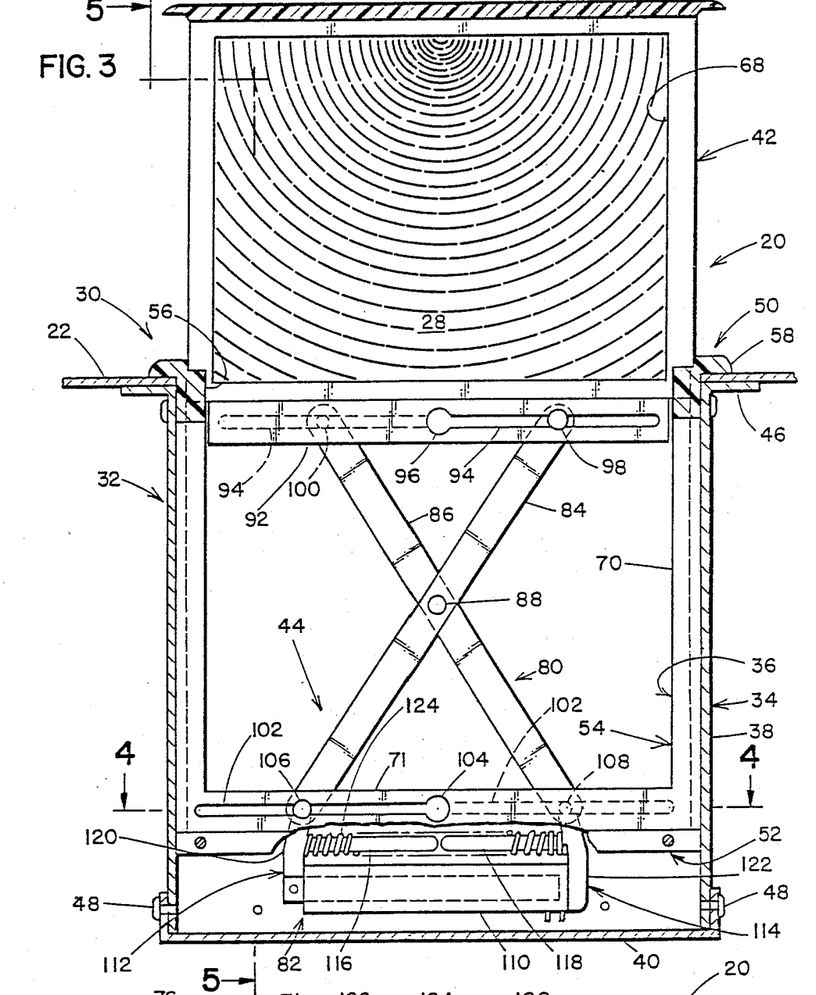
FIG. 3 is a rear view similar to FIG. 2, except the apparatus is shown in the extended operational position.
Figure 4:
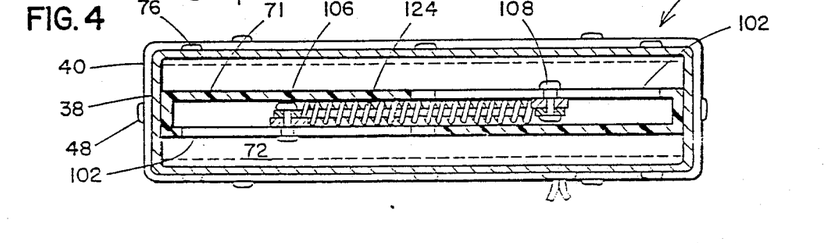
FIG. 4 is a cross-sectional view taken along line 4—4 of FIG. 3.
Figures 5, 6:
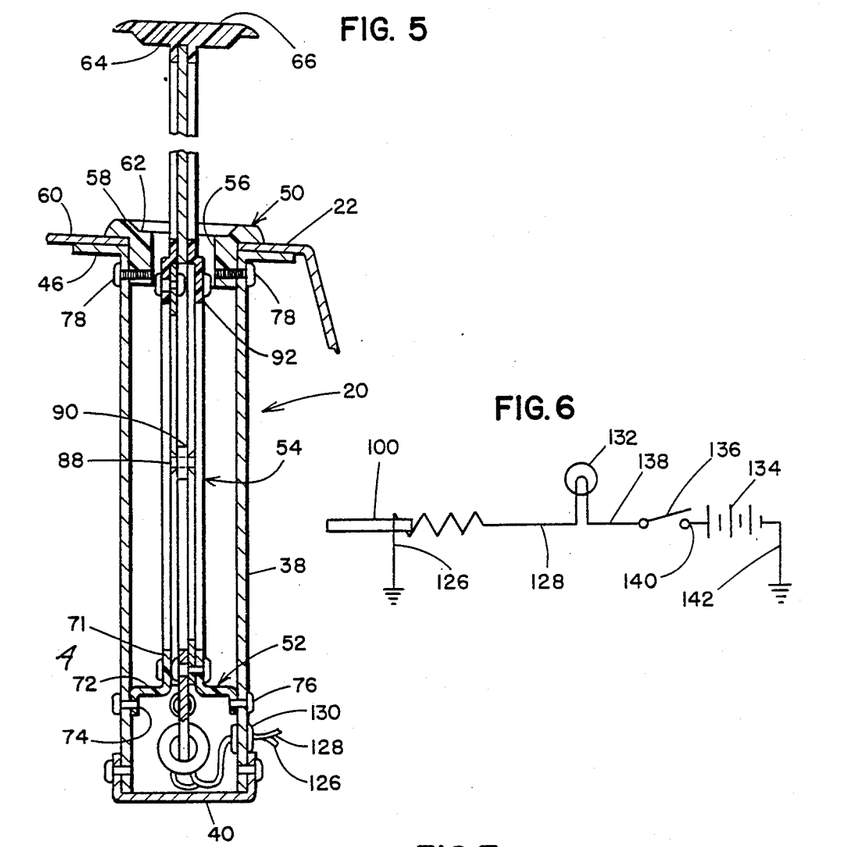
FIG. 5 is a cross-sectional view taken along line 5—5 of FIG. 3.
FIG. 6 is an electrical schematic diagram showing the electrical actuator used in the lens apparatus of the present invention be wired in series with the backup lights of a vehicle.

With reference particularly to FIGS. 3 and 5, lens apparatus 20 is shown in the preferred embodiment to include a Fresnel lens 28 supported by cantilevering mechanism 30 which is attached to wall 22 as described in more detail hereinafter. Fresnel lens 28 is preferably constructed with its optical center near an upper portion thereof so that only the portion of an image behind and beneath the vehicle will appear enlarged to the driver. The cantilevering mechanism 30 includes a housing 32 comprising a container 34 with a liner 36. Housing container 34 includes a sidewall unit 38 having a bottom 40. Lens 28 is held by a holder 42 which is moved up and down by retractable extending mechanism 44.

More particularly, sidewall unit 38 has an elongated, cross-sectional, rectangular shape. Sidewall unit 38 includes a peripheral flange 46 at the top end such that flange 46 fits against the inside of wall 22. The opposite end of sidewall unit 38 is covered by bottom 40. Bottom 40 is an elongated, rectangular box formed so that sidewall unit 38 just fits therein. A plurality of screws 48 pass through openings in the walls of bottom 40 and are threaded into openings of the bottom end of sidewall unit 38 to hold bottom 40 to sidewall unit 38.

Figure 2:
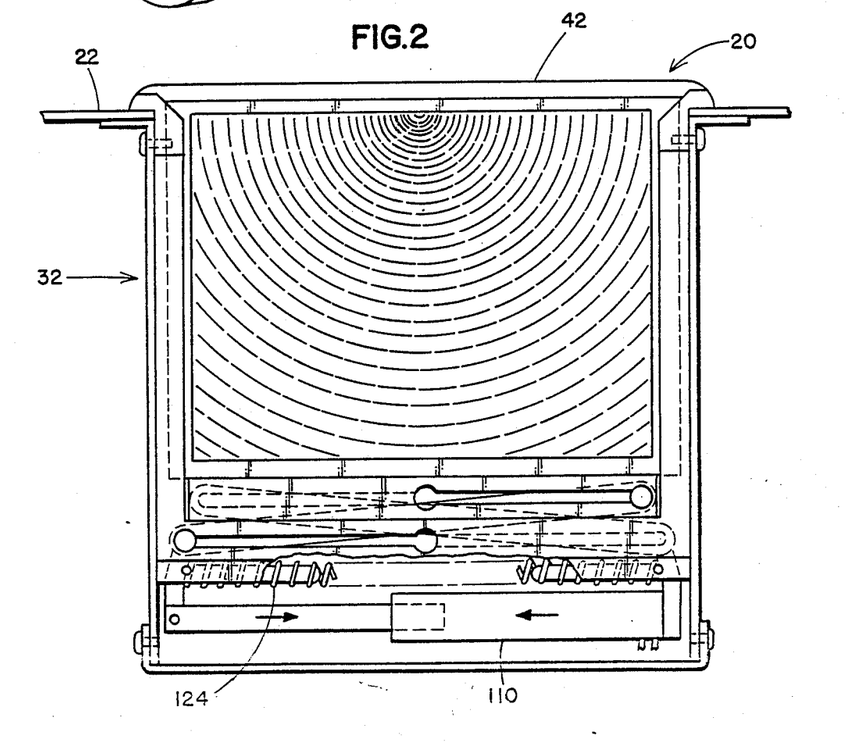
FIG. 2 is a rear view, in partial cross-section and with some portions partially cut away, of lens apparatus of a type used with the vehicle of FIG. 1.

Housing liner 36 includes a top portion 50, a bottom portion 52, and a lens holder receiving portion 54 therebetween. Top portion 50 includes a rectangular walled plug 56 for fitting in the top end of sidewall unit 38 and maintaining alignment of liner 36 at the top end of sidewall unit 38. A flange 58 extends outwardly from plug 56 to contact the outer surface 60 of wall 22 of vehicle 26. A recessed seat 62 is centered in the top side of flange 58 to receive a mating protrusion 64 of cap 66 which forms the top end of lens holder 42. Cap 66 is somewhat larger than recessed seat 62 in order to completely cover and protect the rest of lens apparatus 20 when it is in the stowed position as shown in FIG. 2. Lens holder 42 also includes grooved rectangular members 68 which preferably are in unity with protrusion 64 and cap 66 and which receive lens 28 to hold lens 28 like a picture in a picture frame.

Lens holder receiving portion 54 includes grooved members 70 along opposite sides and grooved member 71 at the bottom of liner 36. The grooved members receive lens holding rectangular members 68 of holder 42 and allow it to slide up and down therein. The opposite side groove members 70 are in unity with walled plug 56. As may be seen in FIGS. 2 and 3, the Fresnel lens is constructed so that its optical center is near the top of holder 42. In this way, only the downward portion of an image transmitted through the lens appears expanded to the driver who is viewing the image.

Bottom portion 52 of liner 36 includes connecting walls 72 extending sidewardly from the bottom of the bottom groove member 71. Each of connecting walls 72 has a flange 74 extending downwardly to be adjacent with a wall of sidewall unit 38. Flanges 74 hold liner 36 in alignment with sidewall unit 38 near the bottom thereof. A plurality of screws 76 pass through openings in sidewall unit 38 and threaded openings in flanges 74 to secure the lower end of liner 36 to sidewall unit 38. A plurality of screws 78 pass through openings in the upper portion of sidewall unit 38 and threaded openings in walled plug 56 to secure housing container 34 to liner 36 in such a fashion as to clamp wall 22 of the trunk of the vehicle 26 between flanges 46 and 58. In this way, apparatus 20 attaches to vehicle 26.

It is noted that groove members 70 are of sufficient size so that holder 42 is received in opposite members 70 but stops just at lower member 71 when protrusion 64 is seated in recessed seat 62.

The mechanism 44 for retractably extending lens holder 42 with respect to housing 32 includes a mechanism 80 for movably connecting the bottoms of the lens holder 42 and of the liner 50 together and a mechanism 82 for moving the connecting mechanism 80. The connecting mechanism 80 includes a pair of rigid members 84 and 86 connected together near the center of each with a pin 88 to form a scissor-like assembly. A spacer 90 (see FIG. 5) on pin 88 separates rigid members 84 and 86 from one another. One end of mechanism 80 is slidably connected to the bottom of lens holder 42 and the other end is slidably connected to the bottom of liner 50. More particularly, lens holder 42 includes a pair of walls 92 extending downwardly from the bottom grooved member 68. As shown in FIG. 5, the inside surfaces of walls 92 are spaced apart about the same distance as the outside surfaces of grooved members 68. Each of walls 92 includes a slot 94 which extends in one direction from a larger circular opening 96 centered from side to side in walls 92. One of slots 94 extends in one direction from opening 96 in one of walls 92 and another slot 94 extends from another opening 96 in the other of walls 92. A pin 98 connects one end of rigid member 84 for slidable retention in one of the slots 94, while a pin 100 connects rigid member 86 for slidable retention in the other slot 94. The openings 96 provide for assembly of pins 98 and 100 to slots 94.

In a similar fashion, lower groove member 71 is spaced apart the same distance as walls 92 so that they can contact one another and act as a further stop when lens holder 42 is fully received in housing 32. Preferably, walls 92 would contact lower groove member 71 at the same time that protrusion 64 fully seats in recessed seat 62. In further similarity to walls 92, each of the sidewalls of lower groove member 71 includes a slot 102 extending in one direction from an opening 104 centered from side to side in lower grooved member 71. One slot 102 extends in one direction from an opening 104 in one of the sidewalls of grooved member 71 while another slot 102 extends in another direction from another opening 104 in the other sidewall of lower groove member 71. The lower end of mechanism 80 is retained to lower groove member 71 in a fashion similar to the upper end of mechanism 80 being retained to walls 92 of lens holder 42. That is, a pin 106 slidably connects an end of rigid member 84 to one of the slots 102 while another pin 108 slidably connects rigid member 86 to the other slot 102.

It is noted that Fresnel lens 28 may be flexible so that it can be bent as needed to insert in grooved members 68 of lens holder 42. It can also be rigid and slid into lens holder 42 between walls 92 before rigid members 84 and 86 are connected thereto. If the former type of lens is used, a wall may separate walls 92 from the lower groove member 68. If the latter type of lens is used, then lens 28 is held in place by glue or by a retainer glued or otherwise fastened at the junction between walls 92 and the lower grooved member 68.

Moving mechanism 82 includes an electrical linear actuator 110 which is connected as described hereinbelow to pins 106 and 108 thereby moving them closer or further apart and thus causing the scissor-like mechanism 80 to operate to extend or retract lens holder 42 from liner 36. A pair of T-shaped connecting members 112 and 114 connect actuator 110 to pins 106 and 108, respectively. T-members 112 have the base legs 116 and 118 pointing towards the other. One end of the cross member 120 of T-member 112 connects to rigid member 84, while the other end of cross-member 120 connects to one end of actuator 110. The other cross-member of T-member 114 has one end connected to rigid member 86 at pin 108 and the other end connected to the other end of actuator 110. A coil spring 124 is received about legs 116 and 118 and is fully compressed when mechanism 80 is fully extended. Thus, actuator 110 is normally extended as shown in FIG. 2 so that coil spring 124 is relaxed and lens holder 42 is completely received in housing 32. When actuator 110 is energized, it contracts thereby compressing spring 124 and moving the lower ends of scissor-like mechanism 80 together causing the mechanism to extend vertically and raise lens holder 42. During this movement, groove members 68 of lens holder 42 slide in the grooves of groove members 70 of liner 36. As shown in FIG. 3, in the fully extended operational position lens holder 42 preferably is raised so that most of lens 28 is above the top surface of wall 22. A portion of groove members 68, however, remain in groove members 70 to provide rigidity for the cantilevered lens holder 42 and lens 28.

Actuator 110 is preferably electrically energized as indicated by wires 126 and 128 extending through a grommet 130 in a wall of sidewall unit 38. As shown in FIG. 6, a typical electrical schematic provides for wire 126 connecting to ground. Wire 128 from actuator 110 leads to the backup lights 132 of vehicle 26. The backup lights 132 are connected to one end of battery 134 through a switch 136 via lines 138 and 140. The other side of battery 134 is connected via line 142 to ground. In this way, when the switch 136 is closed when the vehicle is shifted into reverse, both backup lights 132 come on and actuator 110 energizes thereby causing lens 28 and lens holder 42 to extend. When the vehicle is shifted out of reverse so that switch 136 opens, backup lights 132 go out and actuator 110 deenergizes. In that case, spring 124 forces the lower end of mechanism 80 to separate so that lens holder 42 and lens 28 are retracted back into housing 32.

Figure 7:
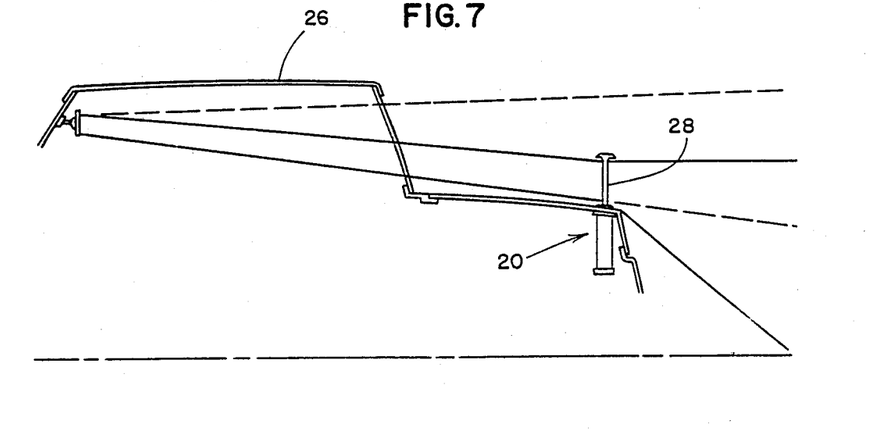
FIG. 7 is an illustration of the field of view when looking through the rear view mirror and the lens apparatus of the present invention as installed on a typical vehicle.

When lens apparatus 20 is functioned to move from a stowed position as shown in FIG. 1 to an extended operational position as shown in FIG. 7, the field of view behind the vehicle is expanded for the operator of the vehicle. That is, although the Fresnel lens functions to demagnify, it also expands the field of view so that the operator can now see quite closely behind the vehicle thereby seeing obstacles which he/she would otherwise not be aware of.

In order to see clearly through a Fresnel lens, it is necessary that the line of sight be approximately perpendicular to the plane of the lens. In FIG. 7, the broken lines illustrate a typical field of view of an operator looking through the rear view mirror. The solid lines illustrate a possible field of view when looking through the rear view mirror and the Fresnel lens 28 of lens apparatus 20.

Figure 8:
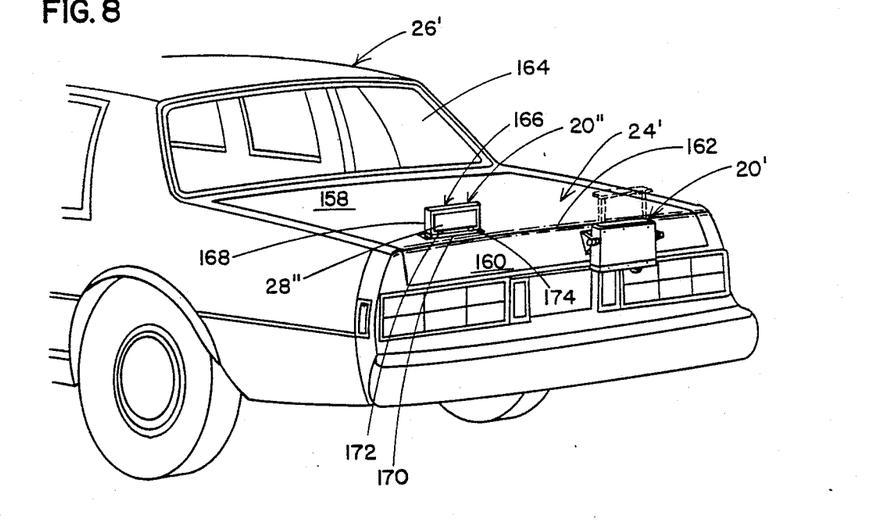
FIG. 8 is a perspective view of a typical vehicle similar to FIG. 1, except two alternate embodiment lens apparatuses of retrofit types are shown.
Figure 9:
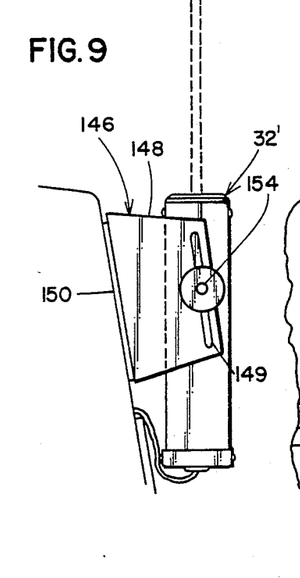
FIG. 9 is a side view of the lens apparatus of FIG. 8.
Figure 10:
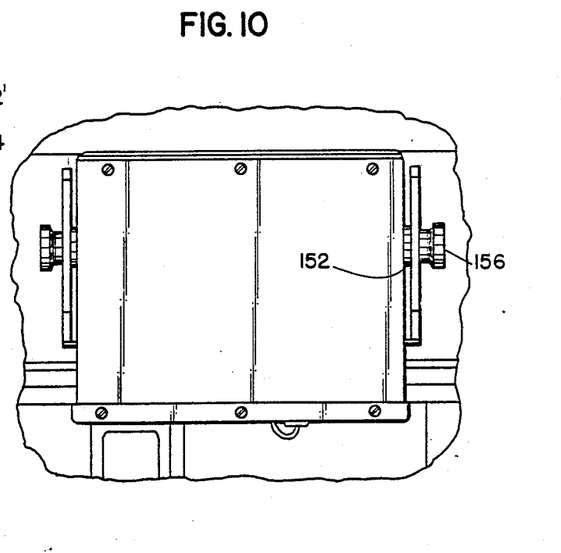
FIG. 10 is a rear view of the lens apparatus of FIG. 8.

In the alternate embodiments, shown in FIGS. 8–10, the same elements as described with respect to the preferred embodiment are identified by the same numerals, only the numerals are primed. As shown in FIG. 8, lens apparatus 20' is attached to the outside back wall of trunk 24' of vehicle 26', shown to be an automobile. The trunk 24' has first and second walls 158 and 160, respectfully, with a conforming region 162 therebetween. It is noted that first wall 158 is generally horizontal, while second wall 160 is generally vertical. Second wall 160 is spaced rearwardly from the rear window 164 of automobile 26'.

With respect to lens apparatus 20', as shown in FIGS. 9 and 10 a U-shaped bracket 146 holds housing 32'. Bracket 146 has legs 148 with a base 150 extending therebetween. Base 150 is bolted, glued, or otherwise attached (not shown) to wall 144. Each leg 148 includes an approximately vertical slot 149. Apparatus 20' is the same as apparatus 20 except it does not receive a wall between flanges 46 and 58 and it includes a boss 152 on each side of sidewall unit 38. A threaded stud 154 extends from each boss 152 through slot 149. A knurled, enlarged nut 156 threads onto the stud 154 to tighten leg 148 between boss 152 and nut 156 thereby holding housing 32 between legs 148. Apparatus 20' is readily adjusted in height and rotated on studs 154 so that a proper elevation and orientation for the Fresnel lens can be achieved. Bracket 146 is installed so that when the Fresnel lens is extended in the operational position, it is readily visible by the operator of vehicle 26. Preferably, bracket 146 and apparatus 20' are installed so that both are beneath the extended design lines of first wall 158 when the Fresnel lens of apparatus 20' is in the stowed position.

Another alternate embodiment is shown in FIG. 8. Particularly, lens apparatus 20" is shown attached to first wall 158 in a location preferably as close as possible to conforming region 162. In any case, lens apparatus 20" is attached substantially nearer conforming region 162 than it is to rear window 164. Lens apparatus 20" includes a Fresnel lens 28" mounted in a holder 166. Holder 166 is preferably a unitary member formed as a frame 168 about lens 28" having a base 170 which is substantially perpendicular to frame 168. Base 170 includes a plurality of openings (not shown) which are matched with openings (not shown) in first wall 158 so that nut and bolt combinations 172 may be used to provide attachment. Shims 174 having equal thickness or wedge shapes may be used between base 170 and first wall 158 to elevate or better orient apparatus 20".

Lens apparatus 20" is not retractable, but has the advantage of simplicity while yet providing the desired availability of viewing ground nearer automobile 26' then would otherwise be possible. Lens apparatus 20" can be mounted on many different models of automobiles and when mounted as close as possible to conforming regions 162, the first wall 158 of trunk 24' does not block the expanded view provided by lens 28".

In use, the first two embodiments of apparatus in accordance with the present invention are normally in the stowed position. When the vehicle is shifted into reverse, the moving mechanism 82 is energized and the lens 28 is moved to an operational position so that the line of sight from the operator of the vehicle is approximately perpendicular to the lens. When the vehicle is shifted from reverse, the moving mechanism 82 is deenergized and spring 124 causes the lens to be retracted and moved back into the stowed position. While in the operational position, the operator has the advantage of being able to expand his field of view and see more closely behind the vehicle.

Lens apparatus 20" is used by an operator of automobile 26' simply by looking through the rear view mirror and lens 28" when he/she is backing. Lens apparatus 20" does not automatically extend and retract like the other embodiments.

A further embodiment of the instant invention is illustrated in FIGS. 11–14. In this embodiment, lens apparatus 180 includes a bracket member 182 adapted to be mounted upon the horizontal trunk portion 24 of a vehicle 26. Bracket member 182 is preferably formed to be L-shaped, having a horizontal portion 186 and a vertical portion 184. In order to facilitate mounting of bracket 182 onto a trunk 24, an adhesive strip 196 may be provided on a lower surface 194 of horizontal portion 186.

Figures 11, 12, 13:
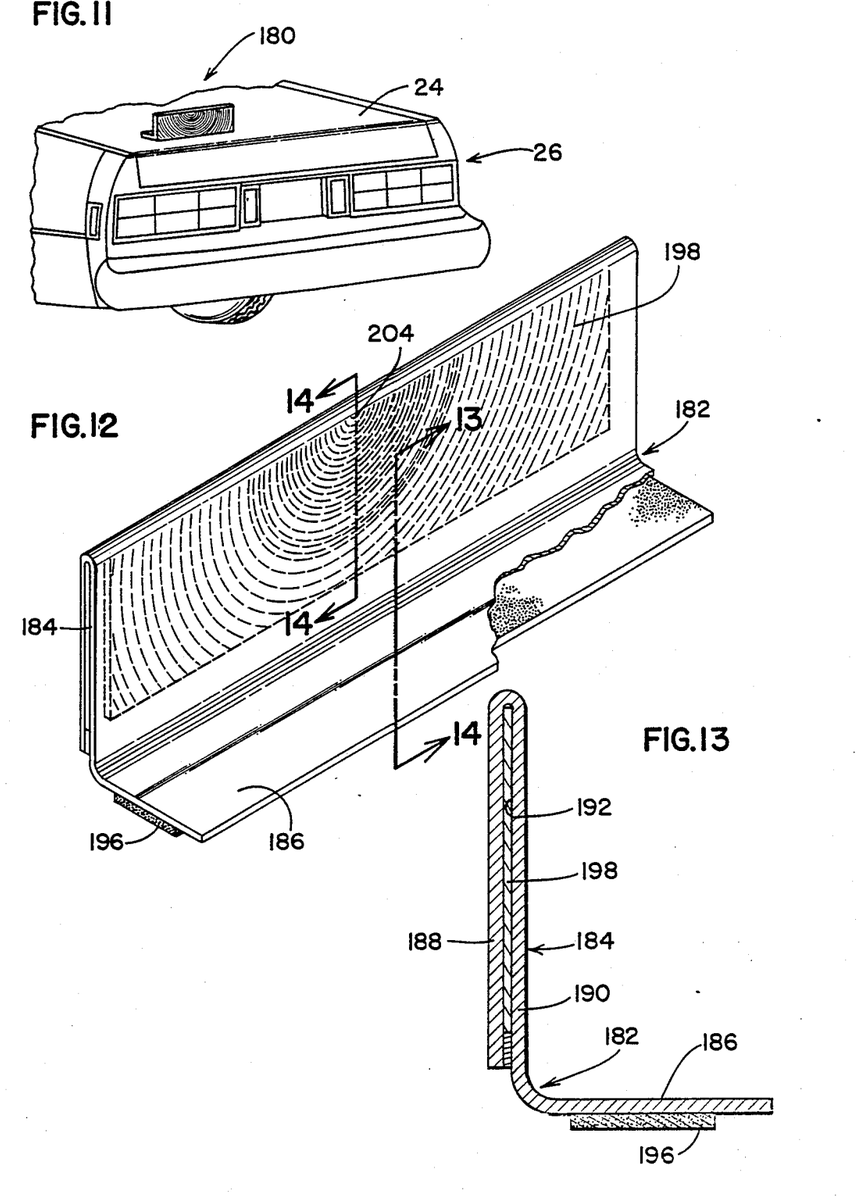
FIG. 11 is a perspective view of a third embodiment of the instant invention on a vehicle.
FIG. 12 is a perspective view of the embodiment of FIG. 11 depicted in isolation.
FIG. 13 is a cross-sectional view taken along lines 13—13 in FIG. 12.

Vertical portion 184 of bracket member 182 preferably includes transparent first and second side members 188, 190 having an inner surface 192 defining a mounting space for receiving Fresnel lens 198. Fresnel lens 198 may be retained within the space between plates 190, 188 by the resiliency of the plates themselves, or by a suitable transparent adhesive.

Figure 14:
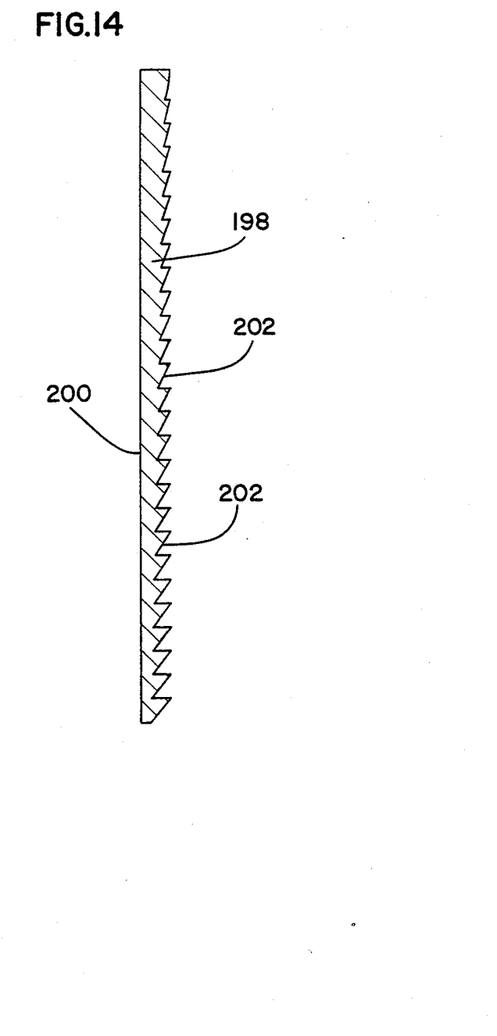
FIG. 14 is a cross-sectional view of a Fresnel lens of the type used in the embodiment of FIGS. 11–14.

FIG. 14 illustrates the cross-section of a Fresnel lens of the type which is used in the embodiment of FIGS. 11–13. As shown in FIG. 14, Fresnel lens 198 has a flat surface 200 defined in one side thereof, and a series of concentric prismatic lens rings 202 provided on an opposite side which are formed about a lens center 204. In use, an image will appear normal when viewed through lens center 204, but will be magnified in the direction of the oblique outer surfaces of lens rings 202 when viewed through that portion of the lens. The lens center 204 is preferably at the top center of vertical portion 184. In this way, the field of view is expanded downwardly and sidewardly which is the desired directions, but not upwardly.

It is understood that the embodiments of the present disclosure are representative of the invention. It is recognized that there may be many equivalent mechanisms for housing the lens and moving the lens. Furthermore, it may be possible to keep the lens in a fully extended cantilevered position at all times and simply attach the cantilevering mechanism to an appropriate vehicle surface. In any case, any changes made in structure with respect to the present invention, especially in matters of shape, size and arrangement of elements, to the full extent extended by the general meanings of the terms in which the appended claims are expressed are understood to be within the principle of the present invention.

What is claimed is:

1. An apparatus for enlarging a field of view for a driver of a vehicle, comprising:
   (a) lens means for expanding an image in at least one principal direction;
   (b) means adapted for mounting said lens means to a rearward non-window portion of the vehicle, said mounting means comprising means for cantilevering said lens means from a surface of a wall of the vehicle so that said lens means is approximately perpendicular with respect to a line of sight of a driver, said cantilevering means including a housing, means for holding said lens means and means for retractably extending said holding means with respect to said housing.

2. The apparatus in accordance with claim 1 wherein said housing includes a liner having a first flange and a sidewall unit having a second flange, said mounting means including means for fixing said liner and said sidewall unit together so that said wall is received and held snugly between said first and second flanges.

3. The apparatus in accordance with claim 1 wherein said housing includes a liner having facing grooves for receiving said holding means, each of said liner and said holding means having bottoms, said retractably extending means including means for movably connecting said bottoms together and means for moving said connecting means so that when said moving means moves said connecting means, said holding means moves in the grooves of said liner.

4. The apparatus in accordance with claim 3 wherein said connecting means includes a pair of rigid members connected together in a scissor-like assembly having a first end slidably connected to the bottom of said holding means and a second end slidably connected to the bottom of said liner.

5. The apparatus in accordance with claim 4 wherein said moving means includes an extendable electrical actuator connected between said rigid members at one of said first and second ends.

6. Lens apparatus for a vehicle, said vehicle having driving means with a forward and a reverse and backup lights which are on when said vehicle is shifted into said reverse, said vehicle having a back window, said apparatus comprising:
  a lens;
  means for supporting said lens on a non-window surface at a distance spaced rearwardly from said back window, said supporting means including first and second positions for said lens, said lens in said first position being approximately perpendicular with respect to a line of sight of an operator of said vehicle, said lens in said second position being stowed for forward operation of said vehicle; and
  means for moving said lens between said first and second positions, said moving means including means for electrically connecting said moving means and said backup lights so that when said backup lights are on, said lens is moved to said first position and when said backup lights are off, said lens is moved to said second position.

7. An apparatus for enlarging a field of view for a driver of a vehicle, comprising:
  (a) lens means for expanding an image in at least one principal direction;
  (b) means adapted for mounting said lens means to a rearward non-window portion of the vehicle so that said principal direction corresponds to an area behind and beneath the vehicle, said mounting means comprising means adapted for cantilevering said lens means from the portion of the vehicle so that said lens means is approximately perpendicular with respect to a line of sight of a driver, said cantilevering means including a bracket, means adapted for fixing said bracket to the portion of the vehicle, a housing, and means for adjusting said housing with respect to said bracket.

8. An apparatus for enlarging a field of view for a driver of a vehicle comprising:
  (a) an L-shaped bracket including a substantially horizontal portion and a vertical portion projecting substantially perpendicular to and upward from said horizontal portion, said vertical portion including transparent first and second side members which define a mounting space therebetween, a Fresnel lens mounted in said mounting space between said first and second side members, said Fresnel lens having a lens center which is positioned near an upper edge of said vertical portion; and
  (b) means adapted for attaching said L-shaped bracket to an outer non-window surface of the vehicle so that the Fresnel lens is approximately perpendicular to a direct line of sight, whereby a major blind spot is made visible to the driver.

9. Lens apparatus for a vehicle, said vehicle having driving means with a forward transmission position and a reverse transmission position, said vehicle further having a back window, said apparatus comprising:
  (a) a lens;
  (b) means for supporting said lens on a non-window surface at a distance spaced rearwardly from said back window, said supporting means including first and second positions for said lens, said lens in said first position being approximately perpendicular with respect to a line of sight of an operator of said vehicle, said lens in said second position being stowed for forward operation of said vehicle; and
  (c) means for moving said lens between first and second positions, said moving means including means for electrically connecting said moving means and said driving means so that said lens is moved to said first position when said driving means is in said reverse position, and for moving said lens means to said second position when said driving means is in said forward position, whereby a significant blind spot is made visible for the driver of said vehicle when said driving means is in said reverse position.

* * * * *

UNITED STATES PATENT AND TRADEMARK OFFICE
CERTIFICATE OF CORRECTION

PATENT NO. : 4,906,082

DATED : March 6, 1990

INVENTOR(S) : Meyer (Mike) Gold

It is certified that error appears in the above-identified patent and that said Letters Patent is hereby corrected as shown below:

On the title page, in item [76]
"53950" should read --5395--

Signed and Sealed this

Seventh Day of January, 1992

*Attest:*

HARRY F. MANBECK, JR.

*Attesting Officer*          *Commissioner of Patents and Trademarks*